United States Patent [19]

Gebhardt

[11] Patent Number: 4,781,659

[45] Date of Patent: Nov. 1, 1988

[54] TORSIONAL VIBRATION DAMPER WITH A V-BELT PULLEY CONNECTED THERETO

[75] Inventor: Hans Gebhardt, Langenzenn, Fed. Rep. of Germany

[73] Assignee: MAN Nutzfahrzeuge GmbH, Munich, Fed. Rep. of Germany

[21] Appl. No.: 111,444

[22] Filed: Oct. 21, 1987

[30] Foreign Application Priority Data

Oct. 21, 1986 [DE] Fed. Rep. of Germany ....... 3635702

[51] Int. Cl.$^4$ ............................................. F16H 55/14
[52] U.S. Cl. ........................................ 474/94; 74/574; 474/903
[58] Field of Search ................. 474/94, 902, 903, 158, 474/159, 164; 29/159 R; 74/574; 192/106.1; 464/89

[56] References Cited

U.S. PATENT DOCUMENTS 4,561,532  12/1985  Knodel ............................ 74/574 X

FOREIGN PATENT DOCUMENTS 2146408  4/1985  United Kingdom ................. 474/94

Primary Examiner—Thuy M. Bui
Attorney, Agent, or Firm—Becker & Becker

[57] ABSTRACT

A torsional vibration damper with a V-belt pulley unit (Front power take-off) attached to the primary part of the damper. In order to increase the service life of the damper and to improve the level of loading in the front PTO, the V-belt pulley is mounted radially and axially on a support element that is connected to the primary part of the damper. A specially designed coupling element, which contains an elastomer that has a high degree of torsional elasticity, is used in conjunction with the axial bearing. In this way, a supercritical adjustment is attained for the vibration system of the PTO, the vibration damper itself being used only for damping the torsional vibrations of the engine crankshaft.

3 Claims, 1 Drawing Sheet

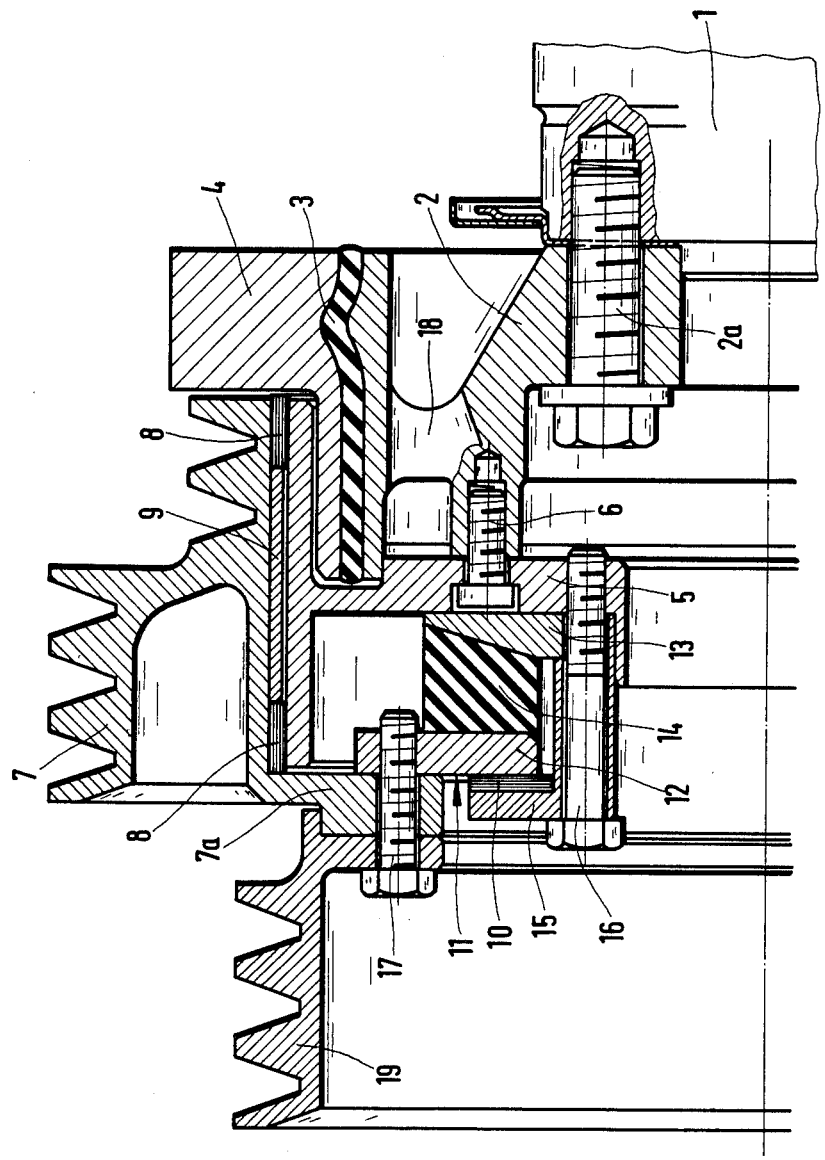

TORSIONAL VIBRATION DAMPER WITH A V-BELT PULLEY CONNECTED THERETO

BACKGROUND OF THE INVENTION

The present invention relates to a vibration damper, for damping rotating masses, and includes a primary part that is adapted to be mounted on a shaft, especially a crankshaft of a multi-cylinder reciprocating-piston internal combustion engine, and a secondary part that is disposed in the radial direction relative to the primary part and is connected to the latter via an elastic damping means, preferably of rubber, with a support element for a V-belt pulley furthermore being secured to the primary part.

A torsional vibration damper of this general type was disclosed in German Offenlegungsschrift No. 27 44 406.

Dampers of this type start to operate only when resonance speeds occur, with the vibration system being split by the elastic connection of the secondary part into an additional form of vibration with nodes in the damper. By appropriate tuning, it is possible to damp dangerous resonances effectively.

The end of the cranksaft on which the torsional vibration damper is mounted (opposite the flywheel end) is at the same time preferably used to drive auxiliary devices and for other power take-off. In this connection, reference is made to "Front power take-off", abbreviated "Front PTO". Appropriate variants of V-belt pulleys, referred to as "fan-end mass moments of inertia", are provided on the primary or secondary end of the damper.

If a given spring-mass system is provided with a different fan-end moment of mass inertia, in most cases that involves a readjustment of the damper, i.e. corresponding moments of mass inertia at the fan end require specific dampers with associated characteristic frequencies. In this case it is customary to adapt the characteristic frequency to the "engine crankshaft" vibration system.

The substantial change in the vibration behavior is due to the fact that on account of their greater distance from the vibration node, the fan-end masses have a greater effect upon the frequency behavior than do corresponding masses (for example from a coupling) at the flywheel end.

It has also been possible to establish by means of measurements that, apart from the influence of masses of inertia, influence is also exerted by the torque transmission. It has thus been possible to observe that in the case of radial power take-off via V-belts, negative changes have occurred in the damper stressing, depending upon the power take-off.

As a result of the above-mentioned adjustment of the characteristic frequency, the first "Front PTO" vibration system, i.e. the attached operating machines or auxiliary drive, considered in terms of torsional vibration, was frequently driven in the subcritical range (i.e. the excitation frequency is below the natural frequency), and in part even in resonance. In this connection it is necessary to mention the disadvantage that continuing or extending structural elements of the PTO are subjected to increased stressing due to rotational angle deflections and vibration moments. Increased noise, e.g. in power-drive transmissions, and increased wear of the components on shaft hub connections and universal-joint shafts, result in part in unsatisfactory operating results.

The object of the present invention is to keep a vibration damper of the aforementioned general type as free as possible from the effects of the PTO, and to embody the PTO in such a way that the latter is more suitable for the fluctuating power requirement that occurs there in the case of radial and/or axial power take-off, i.e. that the PTO is properly insulated against vibration and is free from noise.

BRIEF DESCRIPTION OF THE DRAWING

This object, and other objects and advantages of the present invention, will appear more clearly from the following specification in conjunction with the accompanying schematic drawing, which is a longitudinal cross-section through one exemplary embodiment of the invention torsional vibration damper, on which is mounted a V-belt pulley unit.

SUMMARY OF THE INVENTION

The vibration damper of the present invention is characterized primarily in that the support element is designed as a bearing support for a radial and axial bearing of the V-belt pulley, and in that a coupling element, which comprises an inner part, an outer part, and a vulcanized elastomeric block interposed between them, is disposed in the region of the axial bearing between the belt pulley and the bearing support: furthermore, the elastomeric block is made of a soft rubber mixture that has a high degree of torsional elasticity.

By virtue of the invention, an adjustment to two different vibration systems is made, with the secondary part of the vibration damper alone being used individually for damping the torsion vibrations of the engine crankshaft. The frequency ratio, for example in an engine having six in-line cylinders and a 12 l pistion displacement, is approximately 10:1 (vibration damper characteristic frequency 186 Hz; front PTO natural frequency 18 Hz). As a result of the inventive features, a supercritical adjustment (excitation frequency, i.e. operating speed x excitation order is far above the natural frequency of the PTO, i.e. the critical speed) is obtained for the vibration system of the PTO. In particular, the following is achieved with the inventive features: The V-belt tensile forces are absorbed by the radial bearing. The axial bearing fixes the assembled structure, and in addition the axial forces are absorbed, for example by universal-joint shafts. By appropriately designing the axial bearing, a desired pressure pretensioning can also be exerted upon the coupling element. The inner and outer parts of the coupling element are used to absorb the nominal torque and the vibration moment. The vulcanized elastomeric block, of a soft rubber mixture, has so much torsional elasticity that supercritical adjustment can be achieved. The elastomeric block can be varied for PTOs arranged in different ways, and is adapted according to the case in question.

Due to the application of the vibration damper itself exclusively for damping the torsion vibrations of the engine crankshaft, a better mode of operation of the damper, and a longer service life of the damper, are attained. In addition, as a result of this design, a better aptitude or suitability for the most widely differing variants of V-belt drives is attained (reduction of the assortment of parts, elimination of "V-belt jumping").

Although it is known from German Offenlegungsschrift No. 27 44 406 to provide a rubber mass between the support element (which is not, however, designed as a bearing support) and the V-belt pulley, according to the description on page 3, first paragraph, this rubber member also transmits the radial forces, i.e. the elastomer used as a high degree of Shore hardness and is therefore relatively torsionally rigid. In conjunction with the illustrated pressed belt pulley with relatively small masses of inertia, there is absolutely no supercritical adjustment of the PTO. When a highly torsional elastic rubber member is used, such as is required for effecting a supercritical adjustment, a radial bearing is necessary for absorbng the tensile forces of the belt.

In a further development of the invention, a space-saving sliding mount or sleeve bearing is used for the axial and radial bearings of the V-belt pulley. A plastic material (e.g. teflon) can be used as the bearing material for the bearing sleeves or bearing rings. These bearings are subjected to little wear since after a certain initial wear the bearing material becomes glazed and the surface thereof becomes very resistant.

Further specific features of the present invention will be described in detail subsequently.

DESCRIPTION OF PREFERRED EMBODIMENTS

Referring now to the drawing in detail, the torsional-vibration damper comprises a primary part 2 that is in the form of a flange and is screwed or otherwise secured to the crankshaft 1 (screw connection 2a). Ventilation openings 18 are uniformly distributed about the periphery of the flange 2. The torsional vibration damper further comprises a secondary part 4, which is disposed in the radial direction relative to the primary part 2. A resilient damping insert 3 is disposed between the two parts 2 and 4. In the illustrated embodiment, this damping insert 3 is made of rubber and is preferably unbonded, i.e. the rubber is pressed in only.

A support element 5 for a V-belt pulley 7 is mounted to the primary part 2 via a screw connection 6. For this purpose, screw threads are cast in the primary part 2 in a space-saving manner. In this connection, the support element 5 is constructed as a bearing support for a radial bearing 8 and an axial bearing 10 of the V-belt pulley 7. A space-saving rolling or sliding mount or sleeve bearing is advantageously used in this case. In the region of the axial bearing 10, a coupling element 11, which comprises an outer part 12, an inner part 13, and a vulcanized elastomeric block 14 interposed between them, is disposed between the belt pulley 7, or more precisely the flange portion 7a of the belt pulley 7, and the bearing support 5. The elastomeric block 14 comprises a soft rubber mixture that has a high degree of torsional elasticity. The axial bearing 10 is provided for by a bearing hub 15 and two screw connections 16 and 17. In particular, the bearing hub 15 and the inner part 13 of the coupling element 11 are secured directly to the bearing support 5 via the screw connection 16, while the V-belt pulley flange portion 7a is secured directly to the outer part 12 of the coupling element 11 via the screw connection 17. By means of this screw connection 17, an additional V-belt pulley 19 can be mounted to the flange portion 7a.

The coordination of the radial mounting of the V-belt pulley 7 on the bearing support 5 is also made possible by the screw connections 16 and 17. In this connection, a spacer sleeve 9 is provided between the two bearing sleeves 8 shown.

Finally, it should be mentioned that the invention can be used not only with rubber dampers but also with viscous or viscose dampers. In this connection a bearing support, on which a V-belt pulley is provided according to the inventive features of the invention, is secured, as described, to the primary part of the viscose damper.

The present invention is, of course, in no way restricted to the specific disclosure of the specification and drawing, but also encompasses any modifications within the scope of the appended claims.

What I claim is:

1. A vibration damper, for damping rotating masses, including a primary part that is adapted to be mounted on a shaft, especially a crankshaft of a multi-cylinder reciprocating-piston internal combustion engine, and a secondary part that is disposed in the radial direction relative to said primary part and is connected to the latter via an elastic damping means, preferably of rubber, with a support element for a V-belt pulley furthermore being secured to said primary part, said vibration damper further comprising:

a coupling element disposed between said V-belt pulley and said support element, with said coupling element comprising an inner part, an outer part, and a vulcanized elastomeric block that is disposed between said inner and outer parts, with said elastomeric block being made of a soft rubber mixture that has a high degree of torsional elasticity; and respective radial bearing means and axial bearing means for said V-belt pulley, with said support element providing a bearing support for said radial bearing means, and said outer part of said coupling element providing a bearing support for said axial bearing means.

2. A vibration damper according to claim 1, in which said inner part of said coupling element is connected to said support element; in which said V-belt pulley has a flange portion that is connected to said outer part of said coupling element; and in which a bearing hub having a flange portion is provided and is connected to said support element, with said axial bearing means being disposed between said flange portion of said bearing hub and said outer part of said coupling element.

3. A vibration damper according to claim 1, in which said radial and axial bearing means are in the form of sliding mounts or sleeve bearings.

* * * * *